Feb. 1, 1966  L. L. LARSON  3,232,627
PATTERN CONTROL DEVICE FOR SPREADERS
Filed Jan. 27, 1964  2 Sheets-Sheet 1

INVENTOR.
LESTER L. LARSON
BY
RICHEY, McNENNY & FARRINGTON
Donald W. Farrington
ATTORNEYS Feb. 1, 1966  L. L. LARSON  3,232,627
PATTERN CONTROL DEVICE FOR SPREADERS
Filed Jan. 27, 1964  2 Sheets-Sheet 2
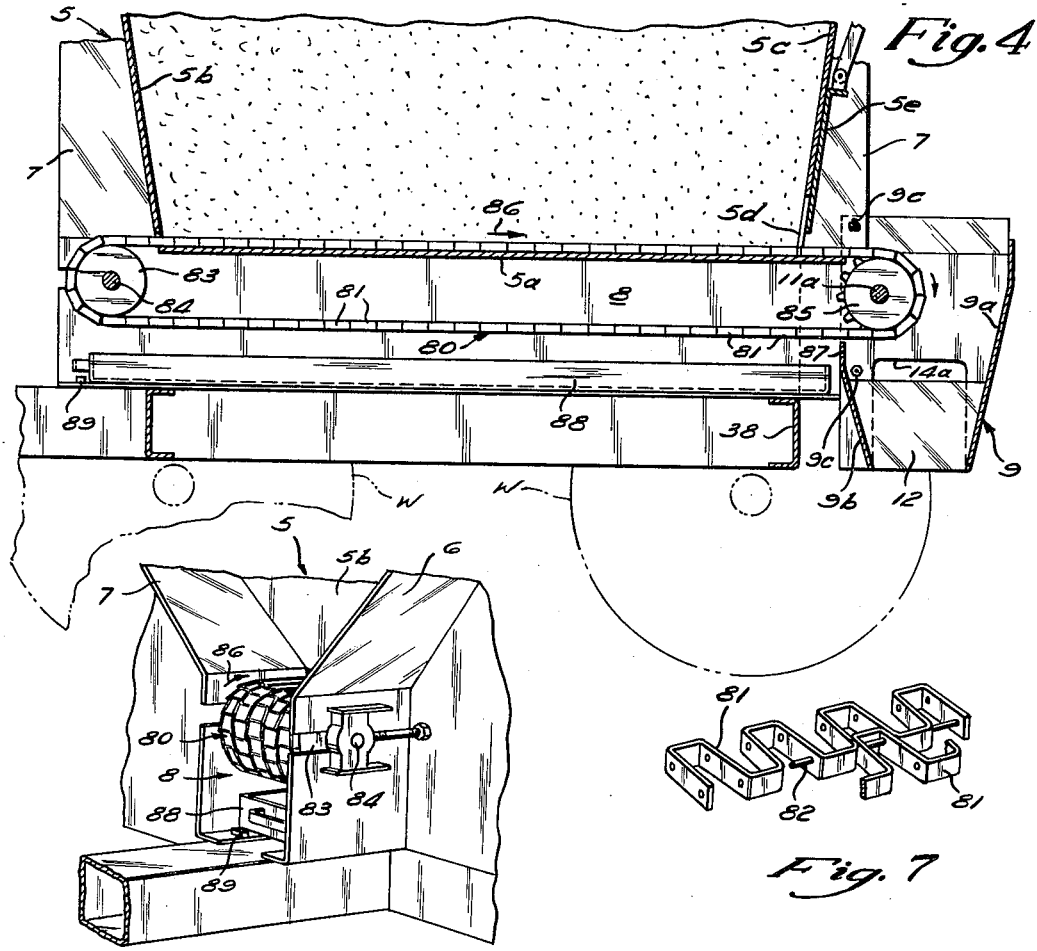
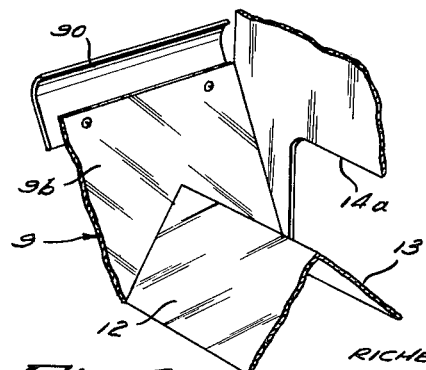
INVENTOR.
LESTER L. LARSON
BY
RICHEY, McNENNY & FARRINGTON
Donald W. Farrington
ATTORNEYS United States Patent Office 3,232,627
Patented Feb. 1, 1966

3,232,627
PATTERN CONTROL DEVICE FOR SPREADERS
Lester L. Larson, Princeville, Ill.
Filed Jan. 27, 1964, Ser. No. 340,193
2 Claims. (Cl. 275—15)

This invention relates to agricultural spreaders and particularly to a spreader suited for the distribution of small grains and pelletized fertilizer products.

A spreader enjoying wide current use includes spreaders of the type described and claimed in my United States Patent No. 2,989,314. Such patented spreaders include vertically mounted throwing fans at each side of the vehicle and such fans are spaced from each other so that a uniform distribution over a width of about forty-five feet of the material to be spread is obtained. Spreaders of the type described in my Patent No. 2,989,314 present a limitation with respect to the load carried in the hopper. Such patented spreaders are particularly useful at that time of the year when the ground is soft and the load carried in the storage hopper is such that the two supporting wheels will not become bogged down in the field.

The recent widespread popularity of pelletized fertilizers has resulted in the sale of such materials in bulk as distinguished from packages or bags. When the conditions of the field will permit, it is more efficient to provide a spreader having a much larger hopper capacity than the prior art two-wheeled spreaders. The present invention relates to that class of spreaders wherein the load of material in the hopper is supported by four ground wheels. Such ground wheels are, of necessity, arranged so as to pass through standard gates, doors, and the like. The method of using such larger spreaders includes pulling the spreader along the highway to the bulk plant and loading the large hopper directly at the bulk plant. Manifestly, such spreaders must be limited as to width for use on the highway and this results in an elongated hopper structure which in turn requires means to convey the material to be spread to the rear of the hopper where it is discharged into the throwing apparatus.

My invention is particularly adapted for use in the elongated hopper type of spreader and is directed primarily to the throwing means which provides a uniform spread pattern on the ground of the material. More particularly my invention relates to a pattern control device utilizing two throwing fans having limited exit means arranged to efficiently and evenly spread the material over a path more than five times the width of the vehicle.

It is among the objects of my invention to provide a spreader having an elongated hopper with means to convey the material to be spread to the rear of the hopper and discharge such material onto a throwing assembly which includes adjacent rotating fans each having a pattern control ring spaced from the peripheral edge of the fan and surrounding the periphery of the throwing fan for more than 180°.

It is a further object of my invention to provide a spreader according to the preceding object wherein the throwing fans are oppositely rotated and the pattern control ring limits the exit area of the material to be spread to a radial angle in the range of between 90° and 135°.

It is a further object of my invention to provide a spreader according to the preceding objects wherein the pattern control ring provides an exit area of about 107°.

It is a further object of my invention to provide a spreader according to the preceding object wherein the control ring is adjustably mounted relative to the longitudinal axis of the vehicle so as to vary the angular relationship between the fan exit and the longitudinal axis of the vehicle.

It is a further object of my invention to provide a spreader according to the preceding object wherein the control ring may be turned to different positions with respect to the vehicle and wherein the control ring may be turned bodily relative to the vehicle about 90° to discharge the material on spaced row crops such as fruit trees, and the like.

Further objects and advantages of my invention relating to safety and efficiency in use will appear from the following description and the appended drawings wherein:

FIG. 4 is an elevation with parts in section illustrating the conveyor for carrying the material longitudinally of the hopper and into the feed box;

FIG. 5 is a perspective view at the forward end of the spreader illustrating the conveyor or mounting;

FIG. 6 is a perspective view with parts broken away illustrating portions of the feed box mounted at the rear of the spreader; and FIG. 7 is a perspective view with parts broken away illustrating the conveyor construction.

Figure 1:
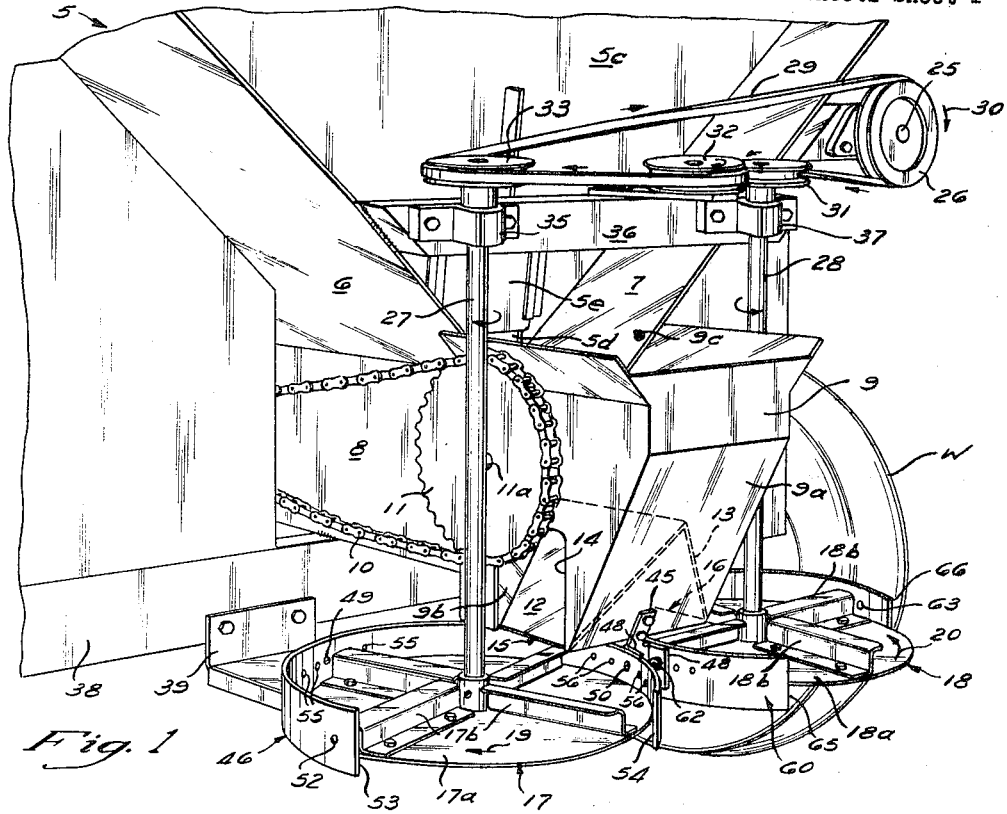
FIG. 1 is a perspective view taken at the rear of a spreader made according to my invention.

Referring to the drawings, the elongated hopper is indictated at 5 in FIGS. 1 and 4. The hopper includes opposed sloping side walls 6 and 7 which extend beneath the hopper bottom 5a to form a trough 8 having spaced side walls housing a conveyor 80. The hopper 5 is provided with a sloping front wall 5b and a sloping rear wall 5c. The conveyor, indicated in its entirety as at 80, is a flexible link construction formed of bent metal strips 81 pivoted to each other by transverse pivot rods 82 as illustrated in FIG. 7. The conveyor 80 is arranged about a smooth surfaced drum 83 journaled on shaft 84 at the forward end of the vehicle. The conveyor 80 is driven by sprockets on drum 85 on shaft 11a at the rear end of the vehicle.

The upper path of the conveyor 80 moves in the direction indicated by arrow 86 in FIG. 4 and is carried along the smooth bottom wall 5a of the hopper. The material in the hopper which is to be spread falls by gravity into the pockets formed by the conveyor links 81 and is carried rearwardly out of the hopper 5 through the wall opening 5d at the rear end of the hopper.

The effective size of the opening 5d in the wall 5c is controlled by the sliding door 5e mounted on the rear wall of the hopper. The material to be spread, which exits through the opening 5d of the hopper, is carried onto the drum 85 within the feed box 9 where it falls by gravity as the pockets in the conveyor 80 are inverted by their travel around the drum 85. The material to be spread which is discharged into the feed box 9 by the conveyor falls on the oppositely sloping walls 12 and 13 at the bottom of the feed box 9. The feed box 9 is attached to the rear end of the trough 8 by bolts 9c through overlapping wall portions of the feed box 9 and the trough 8. The material in the feed box 9 is discharged by gravity through openings such as the opening 14 on opposite sides of the feed box.

Preferably the feed box 9 includes a sloping back wall 9a and a sloping forward wall 9b. In the feed box illustrated in FIG. 4, the wall 9b extends upwardly and terminates in a flexible portion at 87 near the underside of the conveyer 80. The portion at 87 operates so that material carried by the conveyer over the drum 85 will be loosened and scraped off with respect to the conveyer. Such loosened material will be guided downwardly by the sloping wall 9b so as to be discharged from the feed box openings. In the event any particles of the material to be spread are carried forwardly by the lower pass of the conveyor 80 on its way toward the forward drum 83, such particles will be loosened by the motion of the conveyor and will fall into the storage drawer 88.

The drawer 88 extends longitudinally of the vehicle within the trough 8. It is normally retained in its storage position by lugs 89 on the inturned flanges at the forward end of the trough 8. The drawer 88 may be withdrawn and emptied from time to time as required into the hopper 5.

In the feed box modification illustrated in FIG. 6 the wall 9b is provided with a detachable scraper 90 which performs the functions heretofore described in connection with wall portion 87. In the event the scraper 90 becomes damaged or bent by engagement with hardened chunks of material carried by the conveyor, the member 90 may be removed and straightened or replaced.

A chain 10 at the exterior of the trough 8 drives the conveyor within the trough by means of sprocket 11. A transverse shaft 11a extends across the trough 8 and interior sprockets on the drum 85 drive the longitudinal conveyor. It will also be understood that the chain 10 is, in turn, driven by friction means operatively engaging one of the ground wheels W of the vehicle. The specific means for driving the conveyor and the specific construction of the conveyor are not critical with respect to the present invention.

The feed box 9 includes oppositely inclined bottom sections 12 and 13 and form with openings such as 14 and 14a feed mouths 15 and 16. The mouth 15 at the left discharges by gravity the material to be spread onto the fan 17 and the mouth 16 at the right similarly discharges the material to be spread on throwing fan 18. The fan 17 rotates clockwise as indicated by arrow 19, and the fan 18 turns counterclockwise as indicated by the arrow 20.

To drive the throwing fans, an elongated shaft 25 is rotatably supported at the exterior of the upper side wall 7 of the hopper 5. The shaft 25 is preferably driven by a power take-off shaft from the power unit of the tractor which pulls the vehicle over the field. A V-pulley 26 affixed to the shaft 25 drives the fan shafts 27 and 28 by means of the belt 29. Preferably the belt 29 is of the type known as double V-hex which is characterized by a hex shaped cross-section. The power take-off shaft 25 is driven in the direction indicated by the arrow 30 and the belt 29 makes a quarter turn as it comes off of the bottom of the pulley 26 and goes to the driven pulley 31 on the fan shaft 28. An idler pulley 32 has a vertically disposed flat belt engaging surface which bears against the belt 29 as it comes off of the pulley 31.

The belt 29 runs thence from idler pulley 32 to V-pulley 33 which drives the fan shaft 27 and thence back onto the top of the power take-off pulley 26. The belt 29 makes a quarter turn in the span between pulley 33 and pulley 26.

To rotatably support the fan shaft 27 a bearing 35 is mounted on hopper frame member 36 and the right-hand shaft 28 is similarly supported by a bearing 37. The hopper frame member 38, which extends transversely of the hopper beneath the trough 8, carries a bracket 39 which supports at its outer end a bottom bearing 40 to receive the lower end of fan shaft 27. Similarly the right-hand bracket 41 is provided with a bearing 42 to support the lower end of the right-hand fan shaft 28.

A ring support bracket 45 is mounted between the throwing fan 17 and the throwing fan 18 on the lower portion of the feed box 9. The pattern control ring 46 at the left-hand side of the spreader is supported on the bracket 39 by the upstanding lug 47 on bracket 39 and by the ear 48 integrally formed with the bracket 45. The pattern control ring 46 is apertured as shown to receive the bolt 49 carried by the lug 47 and, by means of a similar fastener 50, through the ear 48. Preferably the supporting points for the pattern control ring are about 90° apart. The pattern control ring 46 is also apertured as at 52 at about 90° to the left from the mounting at 47.

Preferably the pattern control ring 46 is proportioned so that the left-hand end thereof, as at 53, is positioned slightly rearward of the center line running through fan shafts 27 and 28. The other end (right-hand end) of the pattern support ring 46 extends a greater distance beyond the center line between the fan shafts so as to terminate at 54. During rotation of the fan 17 the exit area for the material being spread is limited to the open space between the ends 53–54 of the ring. This exit area for the material being spread is preferably about 107°. The angular relationship between the exit area and the longitudinal center line of the vehicle may be varied within limits by inserting fasteners 49 and 50 through apertures such as 55 and 56.

The fan 17 includes the fan disc 17a and Z-shaped blades 17b. The upper arm of the Z-shaped blade 17b projects laterally over the disc 17a a short distance forming a pocket to carry a given quantity of material being spread around the disc as such material is being accelerated centrifugally.

Figure 2:
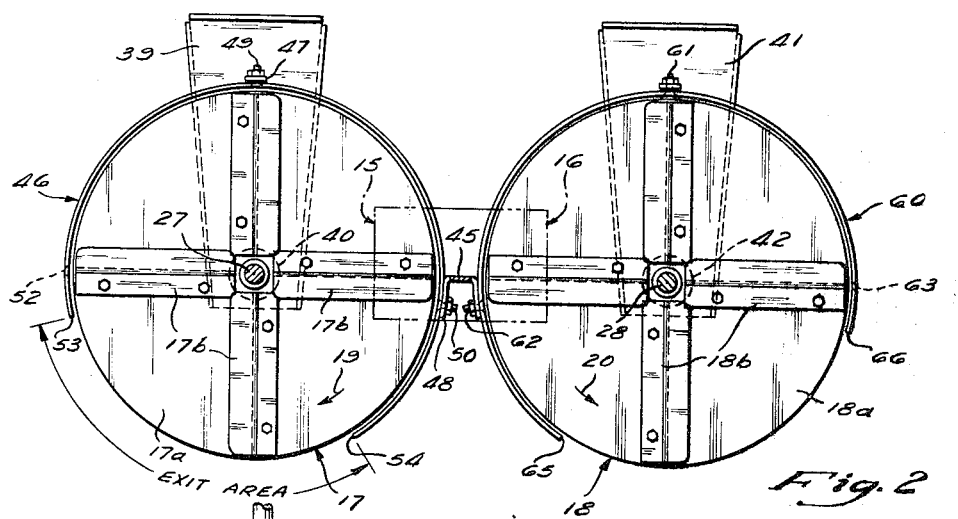
FIG. 2 is a plan view showing the angular relationship of the pattern control ring with respect to the throwing fans.
Figure 3:
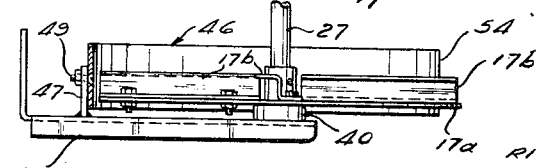
FIG. 3 is a sectional view showing the lower end of the fan assembly and pattern ring support.

It will be understood by reference to FIG. 2 that the material to be spread will not exit from the fan until it has reached the point 54 of the pattern ring 44.

The right-hand fan 18 is provided with a pattern control ring 60 which is supported by fasteners 61 and 62 on the frame bracket 41 and the bracket 45 substantially as described in connection with the left-hand fan 17. The right-hand fan 18 includes blades 18b mounted on disc 18a with the overhang of the Z disposed so as to form a pocket carrying the material to be spread as it moves in the direction of the arrow 20. The control pattern ring 60 is apertured as at 63 about 90° from the aperture which receives the fastener 61.

When it is desired to use the spreader for row crops, such as citrus groves and apple orchards, the pattern control ring 46 may be turned about 90° so as to present the left-hand exit laterally to the left toward a row of trees. Similarly, the right-hand pattern control ring 60 may be rotated 90° so that the fastener 61 is passed through the aperture 63. In this way the exit area at the right-hand of the spreader is directed directly toward the row crop at the right-hand side of the spreader.

Referring to FIG. 2, it will be understood that the material which first exists from the throwing fan 18 will be directed toward the longitudinal center line of the hopper at the terminal end of the control ring 60 indicated at 65. The other edge of the pattern is determined by the terminal end 66 of the control ring 60. The pattern of the material which exits from the fan 18 will overlap the pattern of the material which exits from the fan 17 at a distance rearwardly of the vehicle. By proportioning the control ring as herein described, the two fan-shaped patterns which exit from the respective throwing fans 17 and 18 produce a distribution pattern throughout the total width of the material being spread (about forty-five feet) which is substantially uniform throughout.

In the embodiment of the invention illustrated, the fans 17 and 18 are about fifteen inches in diameter and the centers of the fan shafts 27 and 28 are spaced from each other about seventeen inches. The pattern control ring which surrounds each fan is about two and one-half inches in vertical extent and projects below the fan discs 17a and 18a about one-quarter of an inch.

The peripheral edge of the fan disc 17a is spaced from the inner wall of the pattern control ring 46 about one-eighth of an inch. The transverse width of the feed box 9 is approximately seven inches so that the edges of the discharge mouth at each side of the feed box overhang the pattern control rings in all adjusted positions of the ring.

The positioning of the feed mouth 15, as indicated in FIG. 2, insures that a part of the material falling by gravity onto the fan disc 17a is accelerated by the time such material reaches the end of the control ring indicated at 54. The balance of the material continues to be accelerated and continues to be thrown outwardly as the fan blade carries toward the other terminal of the control ring as indicated at 53. Any material in excess of that which has been discharged through the exit area provided by the control ring will be carried around on the fan within the control ring 46 until such material reaches the other end of the exit area for the throwing fan as at 54. It will be observed that this relationship between the fan exit area is preserved even though the control ring may be turned 90° to the row crop position as above described.

From the foregoing it will be understood that uniform distribution of the material being spread is effective for the full width of the pattern (forty-five feet) for normal, full-width spreading. This is to be distinguished from prior art devices which produced random throwing around the periphery of the fans and discharged some of the material against the rear portion of the spreader.

Although I have described one form of my invention in considerable detail utilizing a pair of throwing fans with a minimum distance between them, it will be understood that four-wheel spreaders having elongated hoppers and means to carry the material to the rear end of the hopper may be provided with greater spacing between the fans and with other variations of the invention without departing from the scope of the invention as defined in the following claims:

What is claimed is:

1. In a pattern control apparatus for a spreader of the type having an elongated frame, a material hopper thereon with material discharge means at the rear of the hopper and frame assembly including vertically disposed oppositely rotating shafts, said pattern control apparatus comprising a bearing bracket carried by the frame and hopper assembly at the rear thereof and projecting therefrom beneath the lower end of each of said rotating shafts, a bearing on said bracket at the outer end thereof for the lower end of the rotating shaft, a fan disc secured to the shaft above said bearing to rotate with the shaft, angularly spaced blades fixed to the upper surface of the disc, each of said blades having a vertically disposed section and an integrally formed laterally extending section at the upper edge of the vertically disposed section, said sections forming with the disc a radially extending material carrying pocket, a pattern ring comprising a continuously arcuate vertically disposed band supported by said bearing bracket in spaced relation to the periphery of said fan disc to limit the discharge of the material from said material carrying pockets to an area generally opposite the bracket, said pattern ring extending about the fan disc in the direction of disc rotation from a point about 90° from the bearing bracket to a point about 45° beyond the vertical plane through the two vertically disposed shafts whereby a part of a fan-shaped material discharge from one pattern control ring overlaps an adjacent part of a fan-shaped material discharge from the other control ring and a substantially uniform density of the material being spread is obtained across the full width of the spread pattern.

2. In a pattern control apparatus for a spreader of the type having an elongated frame, a material hopper thereon with material discharge means at the rear of the hopper and frame assembly including vertically disposed oppositely rotating shafts, said pattern control apparatus comprising a bearing bracket carried by the frame and hopper assembly at the rear thereof and projecting therefrom to the lower end of each of said rotating shafts, a bearing on said bracket at the outer end thereof to receive the lower end of the rotating shaft, a fan disc secured to the shaft above said bearing to rotate with the shaft, angularly spaced blades fixed to the upper surface of the disc, each of said blades having a vertically disposed flat section throughout its length and an integrally formed laterally extending flat section at the upper edge of the vertically disposed section, said sections forming with the disc a radially extending material carrying pocket, said material carrying pockets extending from the central area of the disc to the periphery of the disc, a pattern ring comprising a continuously arcuate vertically disposed flat band connected to and supported by said bearing bracket in spaced relation to the periphery of said fan disc to limit the discharge of the material from said material carrying pockets to an area generally opposite the bracket, said pattern ring extending about the fan disc in the direction of disc rotation from a point about 90° from the bearing bracket to a point about 45° beyond the vertical plane through the two vertically disposed shafts, said pattern ring and bracket interconnection including a removable fastener adapted to extend through one of a series of adjacent openings in the pattern ring to vary the angular disposition of the discharge area relative to the spreader and at the same time maintain the discharge exit area for each fan by the arcuate extension of the pattern ring.

References Cited by the Examiner

UNITED STATES PATENTS

| 1,215,955 | 2/1917 | Mehlberger | 275—15 |
| 1,347,606 | 7/1920 | Wallace. | |
| 2,705,149 | 3/1955 | Torrey | 275—8 |
| 3,085,807 | 4/1963 | Tyler | 275—8 |

ABRAHAM G. STONE, *Primary Examiner.*

WILLIAM A. SMITH III, *Examiner.*